United States Patent [19]

McAlister

[11] Patent Number: 5,515,811
[45] Date of Patent: *May 14, 1996

[54] CUSHION FOR A HOUSEHOLD PET

[76] Inventor: John B. McAlister, 1150 Chapin Rd., Chapin, S.C. 29036

[ * ] Notice: The term of this patent shall not extend beyond the expiration date of Pat. No. 5,363,804

[21] Appl. No.: 338,904

[22] Filed: Nov. 14, 1994

Related U.S. Application Data

[63] Continuation of Ser. No. 97,400, Jul. 23, 1993, Pat. No. 5,363,804.

[51] Int. Cl.⁶ ..................................................... A01K 1/015
[52] U.S. Cl. ........................................................ 119/28.5
[58] Field of Search ................................ 119/28.5; 5/337, 5/355

[56] References Cited

U.S. PATENT DOCUMENTS

| | | | |
|---|---|---|---|
| 3,638,255 | 2/1972 | Sterrett | 5/337 |
| 3,900,648 | 8/1975 | Smith | 428/71 |
| 3,902,456 | 9/1975 | David | 119/28.5 |
| 4,184,237 | 1/1980 | Blankenship | 29/91.1 |
| 4,649,861 | 3/1987 | Elkins et al. | 119/156 |
| 5,002,014 | 3/1991 | Albin | 119/28.5 |
| 5,363,804 | 11/1994 | McAlister | 119/28.5 |

*Primary Examiner*—Thomas Price
*Attorney, Agent, or Firm*—Michael A. Mann

[57] ABSTRACT

The present invention is a cushion for a pet, preferably a cat, comprising a pad of a plurality of layers of raw unwoven, uncovered polyester. Each layer comprises a solid first fiber and a second fiber that has a core and a sheath surrounding the core. The sheath has a lower melting temperature than the core. The pad is then heated to the temperature, where the sheath of the second fiber melts and sticks to the adjacent fiber, whether a first or a second fiber, and then cooled until the second fiber solidifies, attached to the adjacent fiber. The resulting material is a matted web of layered, electrostatic fibers that is subsequently cut into a pad of suitable size, such as large enough to accommodate a sleeping cat. The edge of the pad is bound by sewing or heat treatment.

23 Claims, 2 Drawing Sheets

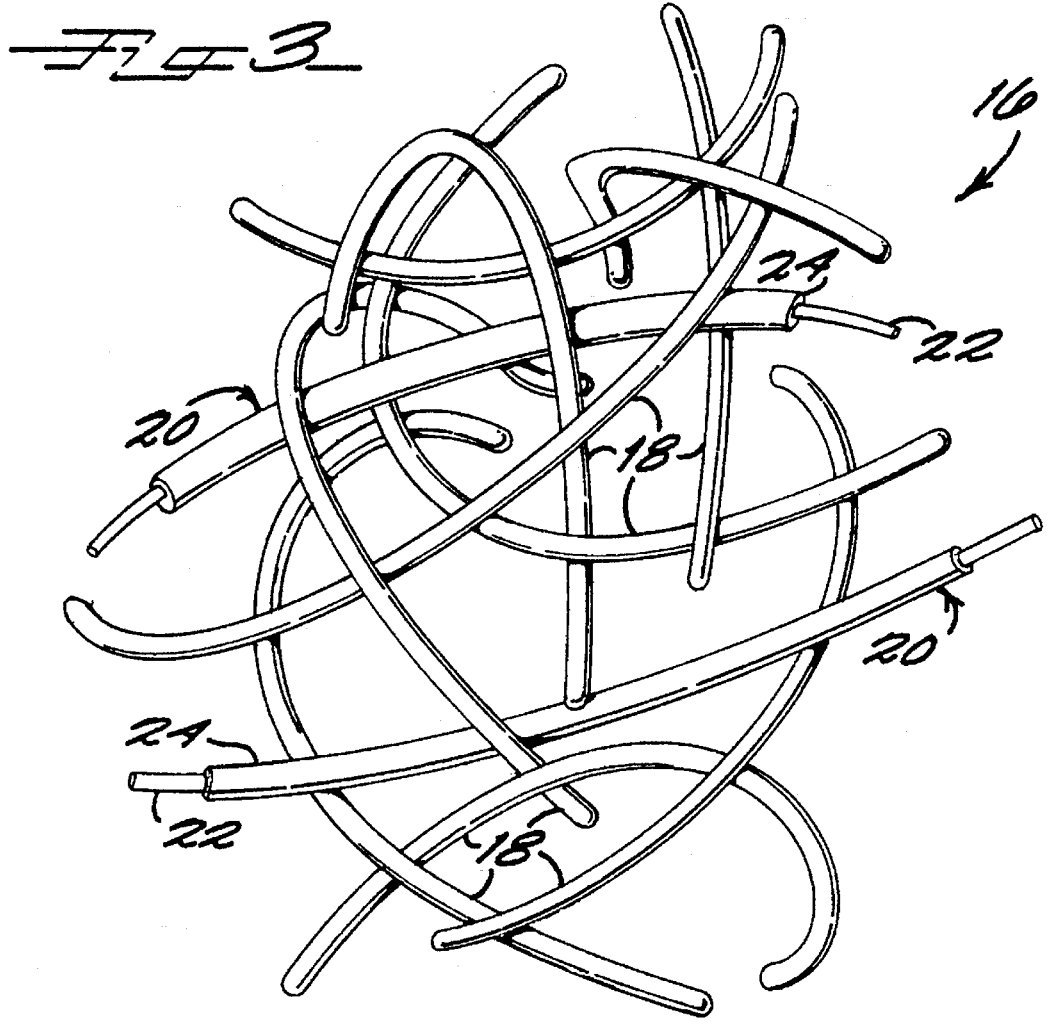

CUSHION FOR A HOUSEHOLD PET

BACKGROUND OF THE INVENTION

1. Field of the Invention

This application is a continuation of Ser. No. 08/097,400, filed Jul. 23, 1993, now U.S. Pat. No. 5,363,804. This invention relates to a cushion for a pet. More specifically, the invention relates to a cushion that attracts a cat.

2. Discussion of Background

People find comfort in having domestic pets, such as dogs and cats. Cats, in particular, are sometimes preferred as pets because many people believe they are easier to care for than dogs. Cats are, however, notoriously independent and curious. They have a tendency to go where they please and to nap on furniture or beds as they please. This habit of napping on beds and furniture can be a problem, especially if a cat has an odor, has fleas, sheds, or if an occupant of the household is allergic to cats.

Pet owners will often purchase cushions for their pets in an attempt to provide a comfortable place for the animal to nap as an alternative to furniture and beds. Typically, these cushions are padded and covered in fabric. Sometimes these are accepted by animals and sometimes not.

A variety of pet beds, pads, or cushions are available for domestic animals. U.S. Pat. No. 3,902,456 granted to David features a cloth-covered cushion, U.S. Pat. No. 5,144,911 granted to Moore, et al. features a water repellent NYLON-covered cushion, U.S. Pat. No. 5,002,014 granted to Albin feature woven polyester strands coated with polyvinyl chloride, and U.S. Pat. No. 3,066,646 granted to Bramley feature polyvinyl chloride reinforced with a web of polyethylene terephthalate.

Other beds are available that feature multiple layers. U.S. Pat. No. 4,649,861 granted to Elkins, et al. describes a three-layered pet mat. U.S. Pat. No. 1,569,710 granted to Butt describes a one-piece pet mat made of an absorbent material, preferably chenille, which is a velvety material having standing wool or silk "fingers".

Pet cushions are also available with insect repellent coatings. U.S. Pat. No. 4,008,688 granted to Nicholas and U.S. Pat. No. 1,569,710 granted to Burt disclose impregnating or saturating a pet cushion with insecticides. U.S. Pat. No. 3,902,456 granted to David alternatively uses an adhesive in conjunction with an intermediate cushion layer to trap insects.

Despite the availability of cushions for pets, there remains a need for a cushion that a cat or other domestic animal will prefer to beds and furniture.

SUMMARY OF THE INVENTION

According to its major aspects and broadly stated, the present invention is a cushion for domestic animals, particularly for cats. The cushion comprises a pad made of a number of layers of fibers, preferably of raw, unwoven polyester fibers. Each layer comprises a plurality of first polyester fibers that are solid and a plurality of second polyester fibers that each have a core and a sheath. A plurality of layers of fibers of first and second fibers is formed by strewing both kinds at random onto a surface. After the layers of fibers are formed into a pad of suitable thickness, the pad is heated to a temperature at which the sheath of second fiber melts against an adjacent fiber, which could be a first or a second fiber, and is then cooled until the second fiber solidifies. When it does, it sticks to the adjacent fiber. The thermally-induced attachment of the fibers gives the pad a webbed or matted finish and good resilience. The fiber layers are cut into a pad dimensioned to be large enough to accommodate a sleeping pet. Then the edge of the pad is bound by sewing or heat treatment to preserve its geometric integrity. The pad is then placed on the floor (or on furniture as a protective cover) where the cat owner wants the cat to nap.

An important feature of the present invention is the combination of the texture and resilience of the pad. The feel of the spaced fibers of the pad and its resilience attracts cats and seems to fascinate them. In this regard, the lack of a cover over the raw polyester is important in the acceptance of the cushion to the cat. The attraction provided by the uncovered pad for cats thus gives the cat owner a measure of control over the cat, because the cat owner can use the cushion to decide where he or she wants the cat to nap.

Another important feature of the present invention is the material of which the cushion is made, namely, raw, unwoven polyester, which is easily cleaned, stain-resistant, and maintains its resilience. Moreover, this material has two properties that make it ideal for the present use as a cushion for a pet: it is naturally electrostatic (cationic) and it is a thermal insulator. Because it is electrostatic, cat hairs and dander tend to cling to this material rather than be spread over the house. Its insulating characteristic keeps the pet warm yet permits air flow and is therefore more comfortable to the pet than fabric-covered cushions.

Other features and advantages will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a detailed view of first and second fibers according to a preferred embodiment of the present invention.

DETAILED DESCRIPTION OF A PREFERRED EMBODIMENT

The present invention, in the preferred embodiment, is a pet cushion, preferably for cats, that has a texture and resilience attractive to cats. The present invention gives the pet owner a tool to effectively define the cat's napping place, and in so doing, make other areas less desirable for napping. In some respects, the present invention is also a novelty for cat owners who enjoy watching cats respond to their environment and furnishing maximum comfort for their pet.

Figure 1:
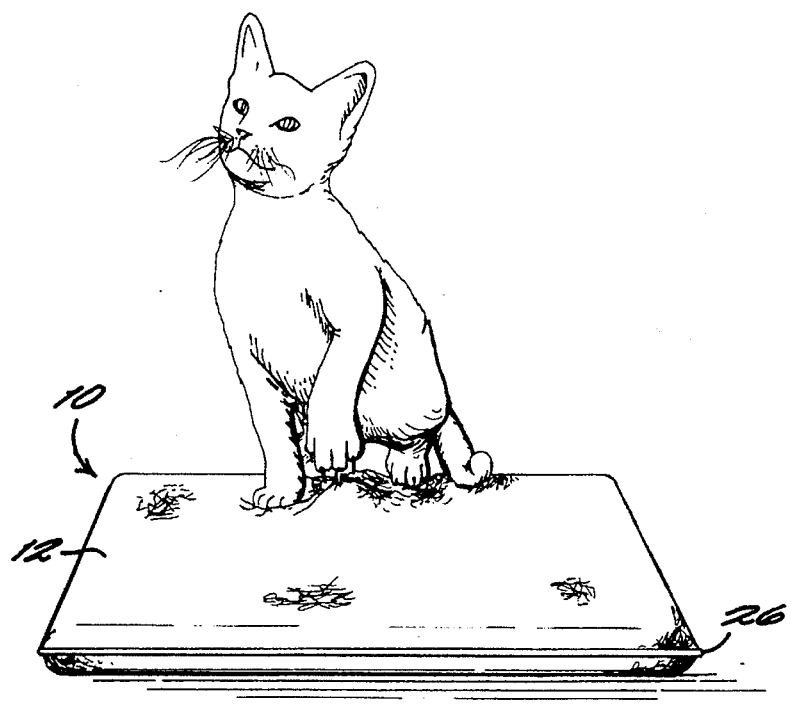
FIG. 1 is a perspective drawing of a cushion according to a preferred embodiment of the present invention.
Figure 2:
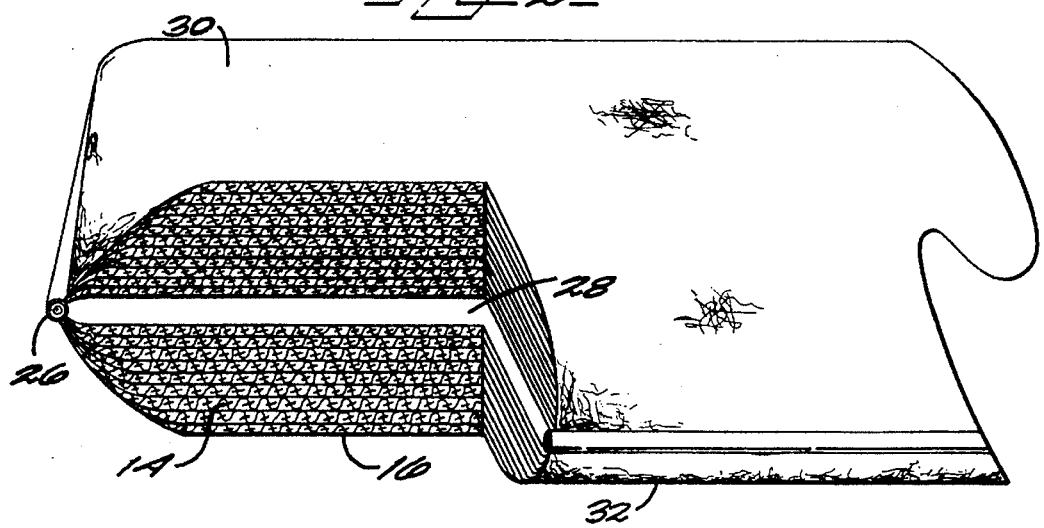
FIG. 2 is a cross sectional view of the cushion of FIG. 1 showing an inner layer according to a preferred embodiment of the present invention.

Referring now to FIGS. 1, 2 and 3, the present invention is illustrated in a preferred embodiment, namely, a cushion generally indicated by reference numeral 10, preferably for cats but suitable for use by other domestic animals. Cushion 10 in its simplest embodiment comprises a pad 12 having a multiplicity of layers 14 of fibers 16, preferably fibers of raw, unwoven polyester. Each layer 14 comprises a plurality of first fibers 18 and a plurality of second fibers 20. Preferably, first fibers 18 comprise approximately 80% by weight of pad 12 and are preferably solid, 15 Denier, polyester fibers, such as those manufactured by Hearst Celanese. Second fibers 20 comprise preferably 20% of pad 12. Each second fiber 20 has a core 22, which is preferably a 2 Denier, polyester fiber, and a sheath 24, preferably a 2 Denier, bi-component copolymer having a low melting temperature, surrounding core 22.

Pad 12 is formed by randomly placing a mixture of first fibers and second fibers on a surface to form a first layer 14 of a plurality of layers 14. Another layer 14 is placed over the first layer 14, and so on. In the preferred embodiment, there are between twenty-five and forty layers required to form a pad of approximately two inches in thickness. Pad 12 is then heated to a temperature where sheaths 24 of second fibers 20 begin to melt against an adjacent fiber of either type: first fiber 18 or second 20. Pad 12 is then cooled. When cooled, sheath 24 of the second fiber 20 solidifies, sticking against the adjacent fiber. Heating followed by cooling gives pad 12 a structure that is highly porous and mat-like, rather than woven, and a resilience.

Pad 12 has a top 30 and a bottom 32. Top 30 is left uncovered so that a pet engages the pad directly. Bottom 32 can be covered or not as desired. A covering on bottom 32 can serve to protect a surface or be simply decorative. Top 30 remains uncovered so that the pet can lie in direct engagement with top 30 of pad 12. This structure, in the form of a cushion about two inches thick, is highly attractive to cats, as it is without coverings, other layers or any further processing except to bind the edges of pad 12.

Cats are known for having a need to scratch and various items such as scratching posts are provided commercially for cat owners to direct this need. Without wishing to be bound by theory, the present pad provides a surface that enables cats to scratch without harming furniture or their claws or toes. Furthermore, the resilience of the pad seems to respond to touch in a life-like manner; specifically, it resists movement and returns to its original shape when pressed. This responsiveness is apparently attractive to cats.

Pad 12 should be made large enough to accommodate a large housecat in a sleeping position, preferably in the form of a square with dimensions of at least twenty inches on a side and a thickness in the range of one-and-one-half to two inches. Top 30 of pad 12 should not be covered with a fabric (although bottom 32 may or may not as desired). A fabric is a barrier to fibers 16 that comprise layers 14, which are an important aspect of the texture of cushion 10. This texture, in combination with the resilience of pad 12, attracts and holds the attention of cats.

The edge 26 of pad 12 is preferably finished or bound by heat treatment or by sewing so that cushion 10 maintains its geometric integrity, that is, fibers 16 are not readily pulled loose so that, gradually, cushion 10 looses its shape.

Pad 12 may also be made with an inner layer 28 (FIG. 2) that can be impregnated with one or more of a variety of compounds, such as a non-toxic, flea retardant chemical. Alternatively, inner layer 28 can be impregnated with a different pesticide, a deodorizer, a fragrance or even cat-nip.

In use, cushion 10 is preferably placed within an area of the home where the owner wants the cat to nap, such as a corner of a kitchen or porch. Alternatively cushion 10 can be secured to an upright object such as a scratching post. Periodically, cushion 10 can be laundered or simply replaced with a new one.

The texture and resilience of cushion 10 appears to attract a cat. A cat will approach cushion 10 out of curiosity and test its surface with a paw. The cat will then climb onto cushion 10 and repeatedly pat its surface as if to test the resilience. The cat will then lie down on the surface and find it more comfortable, because it insulates without preventing air flow through it. Its electrostatic property causes it to retain cat hairs and dander. Because of the curiosity, almost to the point of fascination, exhibited by cats for cushion 10 and its comfort, cushion 10 gives to cat owners a measure of control over their pets and where they nap. The owner can then determine where the cat will nap by placing cushion 10 at that location. The cat's and the owner's interests become aligned.

It will be apparent to those skilled in the art from a careful reading of the detailed description of the foregoing preferred embodiments that many modifications and substitutions can be made in the foregoing without departing frown the spirit and scope of the invention. The present invention, moreover, is not limited to the specific example of uses given but, rather, is defined by the appended claims.

What is claimed is:

1. An article for use as a cushion for a pet, said article comprising:

a pad made of matted, resilient fibers formed in layers, said pad having a top and a bottom, said top being a pet engaging surface whereon said pet can lie in direct engagement with said top of said pad; and a binding carried by said edge.

2. The article as recited in claim 1, wherein said fibers are naturally electrostatic.

3. The article as recited in claim 1, wherein said fibers are thermally insulating.

4. The article as recited in claim 1, wherein said fibers are made of raw, unwoven polyester.

5. The article as recited in claim 1, wherein said pad comprises approximately 25 to 40 layers of raw, unwoven polyester fibers.

6. The article as recited in claim 1, wherein said fibers further comprise a first fiber and a second fiber, said second fiber having a core and a sheath, said sheath comprising a low melt polyester.

7. The article as recited in claim 1, wherein said fibers include approximately 80% by weight of a first polyester fiber and approximately 20% by weight of a second fiber, said second polyester fiber having a core and a sheath, said sheath comprising a low melt polyester.

8. The article as recited in claim 1, wherein said pad further comprises an inner layer, said inner layer impregnated with a non-toxic, flea retardant chemical.

9. The article as recited in claim 1, wherein said pad further comprises an inner layer, said inner layer treated with a pesticide.

10. The article as recited in claim 1, wherein said pad further comprises an inner layer, said inner layer treated with a deodorizer.

11. The article as recited in claim 1, wherein said cushion is dimensioned for a sleeping cat, said surface at least approximately twenty inches square.

12. An article for use as a cushion for a pet, said article comprising:

a pad made of matted, resilient fibers, said pad having an edge, said resilient fibers including a first fiber and a second fiber, said second fiber having a core and a sheath, said sheath comprising a low melt polyester;

said pad having a top and an opposing bottom, said top forming a pet engaging surface whereon said pet can lie in direct engagement with said top of said pad; and a binding carried by said edge.

13. The article as recited in claim 12, wherein said fibers are naturally electrostatic.

14. The article as recited in claim 12, wherein said fibers are thermally insulating.

15. The article as recited in claim 12, wherein said fibers are made of raw, unwoven polyester.

16. The article as recited in claim 12, wherein said pad is made of raw, unwoven polyester approximately one-and-one-half to approximately two inches thick.

17. The article as recited in claim 12, wherein said bottom of said pad is covered but not said top.

18. The article as recited in claim 12, wherein said pad comprises approximately 25 to 40 layers of raw, unwoven polyester fibers.

19. The article as recited in claim 12, wherein said fibers include approximately 80% by weight of a first polyester fiber and approximately 20% by weight of a second fiber, said second polyester fiber having a core and a sheath, said sheath comprising a low melt polyester.

20. The article as recited in claim 12, wherein said pad further comprises an inner layer, said inner layer impregnated with a non-toxic, flea retardant chemical.

21. The article as recited in claim 12, wherein said pad further comprises an inner layer, said inner layer treated with a pesticide.

22. The article as recited in claim 12, wherein said pad further comprises an inner layer, said inner layer treated with a deodorizer.

23. The article as recited in claim 12, wherein said cushion is dimensioned for a sleeping cat, said surface at least approximately twenty inches square.

* * * * *